US006709625B2

(12) United States Patent
Wulfrath

(10) Patent No.: US 6,709,625 B2
(45) Date of Patent: *Mar. 23, 2004

(54) PROCESS AND APPARATUS FOR INJECTION MOLDING OF MOLDED PARTS HAVING AT LEAST ONE CAVITY

(75) Inventor: Marc Wulfrath, Kierspe-Vollme (DE)

(73) Assignee: Battenfeld GmbH, Meinerzhagen (DE)

( * ) Notice: Subject to any disclaimer, the term of this patent is extended or adjusted under 35 U.S.C. 154(b) by 44 days.

This patent is subject to a terminal disclaimer.

(21) Appl. No.: 10/106,800

(22) Filed: Mar. 22, 2002

(65) Prior Publication Data

US 2002/0158361 A1 Oct. 31, 2002

(30) Foreign Application Priority Data

Mar. 23, 2001 (DE) .......................................... 101 14 419

(51) Int. Cl.$^7$ ............................................. B29D 22/00
(52) U.S. Cl. ....................................................... 264/570
(58) Field of Search ................................. 264/570, 572

(56) References Cited

U.S. PATENT DOCUMENTS

| | | | |
|---|---|---|---|
| 4,101,617 A | 7/1978 | Friederich | 264/93 |
| 5,139,714 A | 8/1992 | Hettinga | 264/45.1 |
| 5,198,240 A | 3/1993 | Baxi | 425/145 |
| 5,505,891 A | * 4/1996 | Shah | 264/28 |
| 5,705,201 A | 1/1998 | Ibar | |
| 5,759,479 A | 6/1998 | Gotterbauer | |
| 5,928,677 A | 7/1999 | Gosdin | 425/130 |
| 6,372,177 B1 | 4/2002 | Hildesson et al. | |
| 6,579,489 B1 | 6/2003 | Thomas | |

FOREIGN PATENT DOCUMENTS

| | | |
|---|---|---|
| DE | 24 61 580 | 7/1975 |
| DE | 28 00 482 A1 | 7/1978 |
| DE | 27 16 817 A1 | 8/1978 |
| DE | 42 19 915 | 12/1993 |
| DE | 93 16 984 U1 | 1/1994 |
| DE | 4240017 | 6/1994 |
| DE | 19518964 | 11/1996 |
| DE | 196 13 134 A1 | 10/1997 |
| DE | 199 03 682 A1 | 8/2000 |
| EP | 0 467 201 A2 | 1/1992 |
| EP | 0 400 308 B1 | 6/1993 |
| GB | 2 322 094 | 8/1998 |
| JP | 5-261750 | 10/1993 |
| JP | 10-156856 | 6/1998 |
| JP | 2001-047472 | 2/2001 |

OTHER PUBLICATIONS

"Testing the water," *European Plastics News*, pp. 35–36 (Nov., 1999).
Michaeli, W., et al., "Gas oder Wasser?", KU *Kunststoffe*, vol. 89, pp. 56–58 and 60, 62 (1999).
Michaeli, W., et al., "Gas geben mit Wasser," KU *Kunststoffe*, vol. 89, pp. 84 and 86 (1999).
Michaeli, W., et al., "Kühlzeit reduzieren mit der Wasser–Injektionstechnik," KU *Kunststoffe*, vol. 90, pp. 67–72 (2000).

* cited by examiner

Primary Examiner—Suzanne E. McDowell
(74) Attorney, Agent, or Firm—Hamilton, Brook, Smith & Reynolds, P.C.

(57) ABSTRACT

Process and apparatus for injection molding of molded parts made from plastic material having at least one cavity, which includes: a) injection of plastic melt from an injection unit along a melt flow path into the cavity of an injection-molding die; b) injection of a fluid into the still molten plastic material, so that the latter is pressed against the walls of the cavity; c) allowing the plastic material to solidify until the latter forms the molded part in self-supporting manner; and d) releasing the molded part from the cavity of the injection-molding die.

34 Claims, 3 Drawing Sheets

PROCESS AND APPARATUS FOR INJECTION MOLDING OF MOLDED PARTS HAVING AT LEAST ONE CAVITY

RELATED APPLICATION

This application claims priority to German Application 101 14 419.9, filed on Mar. 23, 2001, the entire teaching of which are incorporated herein by reference.

BACKGROUND OF THE INVENTION

An injection molding process used in the manufacture of molded parts from thermoplastic plastic is known, for example from U.S. Pat. No. 4,101,617. A fluid under pressure is introduced into the still molten plastic melt. The melt is pressed against the cavity wall of the injection-molding die by the pressure thus produced in the interior of the melt; collapsed points due to contraction of volume during cooling are thus avoided.

Nitrogen gas is conventionally used as the fluid, which is injected into the melt under pressure. It has the advantage that as an inert gas, it is not subjected to a chemical reaction in the hot melt. The disadvantage is thus taken into account that the nitrogen is in most cases very expensive to produce. Either the injection-molding device has to be supplied with nitrogen from cylinders or the gas is recovered on site—for greater gas requirement—for example, by means of molecular filters.

The requirements increasing ever further on the economic viability of the process necessitate ever shorter injection-molding cycles with as high as possible quality of the molded parts to be manufactured. In order to achieve the shorter cycles, various attachments have been made:

European granted patent 0 400 308 proposes, after gas injection into the melt, to allow the gas to emerge again at a point remote from the point of injection; circulation of the gas through the cavity provided is then effected. A cooler is integrated into the gas circuit. A more rapid cooling process for the melt should thus be effected, since cooled gas is supplied in the closed circuit.

German Offenlegungsschrift 4 219 915, however, is geared to using cooled gas, which is injected into the melt. Provision is thus made, namely, in that the gas is cooled to temperatures as far as −160° C. The plastic material should cool as rapidly as possible in this manner; the time span from injection of the melt into the injection-molding die to releasing is thus reduced.

SUMMARY OF THE INVENTION

In the previously known processes, it is disadvantageous that, firstly now as before, expensive nitrogen is necessary, and secondly in spite of all measures, the cooling effect remains limited due to the restricted thermal capacity of the gas. Regardless of that, due to the considerable difference in viscosity between melt and gas, there is the problem that flow markings appear now and then on the surface of the molded part, which negatively influence the quality of the molded part to be manufactured.

One aspect of the invention is therefore to further develop the injection-molding process of the generic type, so that the disadvantages are avoided at least in part. The process should thus make it possible to manage without the use of expensive nitrogen. Furthermore, as short as possible a cooling time should be realizable, which noticeably shortens the injection-molding process. Finally, the process should also ensure that as homogeneous as possible a flow path of the melt into the injection-molding die takes place, so that transfer markings can be avoided as far as possible.

In one embodiment, a process is provided for injection molding of molded parts made from thermoplastic plastic material having at least one cavity. This process includes the injection of plastic melt from an injection unit along a melt flow path into a cavity of an injection-molding die in step a). Liquid is injected in step b) into the still molten plastic material so that the latter is pressed against the walls of a cavity, and the plastic material is then allowed to solidify in step c) until the latter forms the molded parts in a self-supporting manner. The molded part is then released in step d) from a cavity of the injection molding die. After injecting the plastic melt in step a) and after injecting the liquid in step b), both the melt flow path and a flow path via which the liquid is injected are closed. The releasing step in this embodiment only takes place when the injected liquid has transferred at least partly to a gaseous state of aggregation. Before releasing the molded part from the cavity, pressure in the interior of the molded part is relieved.

A core concept of the invention is thus geared to using a liquid having high thermal capacity as fluid to be injected into the melt, wherein this ensures that a rapid cooling process takes place, so that the cycle time of the injection-molding cycle can be noticeably reduced. Use is made here of the high thermal absorption during the change in the state of aggregation, by means of which the internal pressure is additionally increased.

Any group of thermoplastics, regardless of whether they are provided with additives, such as glass fibers, chemical or physical propellants or similar, is provided here as plastic material.

During this procedure, it has been shown, surprisingly, that due to the said features, flow markings hardly appear, which are otherwise to be feared and to be observed during the gas-internal pressure process. This is attributed to the comparable viscosity of the liquid melt with the injected liquid of high thermal capacity.

According to a first further development, provision is made in that during the above process step b), some of the still molten plastic material is displaced from the cavity into a spillover cavity. The flow of plastic material from the cavity into the side cavity is thus, in one embodiment, controlled by valve means, which are opened or closed according to a temporal model. Specific influencing of the overflow of melt from the main to the side cavity is thus possible. Furthermore, it is conceivable to use several side cavities, which are controlled independently of one another.

The liquid can be injected into the cavity along the melt flow path through the sprue region directly or via the machine nozzle, through which the plastic melt is supplied, or alternatively to that into the cavity directly by means of an injection nozzle, wherein when the requirement is to form several cavities, a separate injection nozzle is provided for each cavity.

In the second case, it can be advantageous if some of the plastic material situated in the cavity is driven back out again from the cavity during the above step b) by the injected liquid in the direction of the injection unit.

A further improvement in the flow behavior of the melt or the control of this behavior can be seen when, before injection of the thermoplastic plastic melt, a pressure which is increased with respect to the ambient pressure is built up in the cavity by introducing a gas. This gas pressure can be controlled and/or regulated during the above step a) as a function of how the injection pressure of the melt increases during its injection. In one embodiment, the gas pressure is operated according to a predetermined pressure or time profile. It can thus be let down gradually, but also suddenly.

It has proved to be a particularly advantageous embodiment that the liquid is tempered before injection into the still molten plastic material. The thought here is namely that the liquid is cooled to a preset temperature range. A temperature range between about −20° C. and +20° C., in a particular embodiment between about 4° C. and 15° C., is thus provided particularly advantageously. However, it can also be necessary, for example, for materials which are damaged by sudden cooling, to heat the liquid to a preset temperature range. A temperature range between about 20° C. and 150° C., in a particular embodiment between about 40° C. and 100° C., is thus provided particularly advantageously.

At the temperature ranges indicated above, the use of water was thought of first and foremost. However, it is also conceivable to use, for example, liquefied gases, such as carbon dioxide or nitrogen, in order to particularly strengthen the cooling effect. When using such liquids, a temperature range between about −150° C. to −20° C. is offered, wherein the range from about −60° C to −40° C. is used in a particular embodiment. Since the liquid is added to the melt under increased pressure, it ensures that the boiling temperature is increased so that the fluid can be added in liquid form.

In the concept of the invention, particular significance is given to the removal of the injected liquid—possibly still in the injection-molding device. There are several possibilities here in accordance with one embodiment of the invention.

First of all, provision can be made in that after allowing to cool and before releasing, the following process step is executed: c') injection of compressed gas, in one embodiment compressed air, along the path, through which the liquid was injected into the plastic material, and blowing-off of the residual liquid, optionally still remaining in the interior of the molded part, from the cavity of the molded part at at least one blow-off point, which is situated at a point, which is remote from the addition point of the liquid.

The blow-off point is, in one embodiment, arranged in the region of the flow path end of the plastic material.

Alternatively to that, provision can be made in that at the said point in time, the following process step is executed: c") injection of compressed gas, in one embodiment compressed air, at a gas addition point which is remote from the point at which the liquid was injected into the plastic material, and blowing-off of the residual liquid, optionally still remaining in the interior of the molded part, from the cavity of the molded part via the point at which the liquid was injected into the plastic material.

Provision can thus be made to use means which add and discharge again the liquid and/or the compressed gas via the same media path via a suitable transfer device.

Apart from blowing-off of the liquid from the cavity, drawing-off of the liquid is also suitable. Then provision is made in that the following process step is executed: c''') applying a vacuum at a point fluidly connected to the liquid-filled cavity, in order to draw off the residual liquid optionally still remaining from the cavity.

The vacuum is thus applied to the injection nozzle for liquid in advantageous manner. In order to ensure that the molded part is not drawn in on itself by the vacuum, a ventilation opening can be provided before or during application of the vacuum.

As a further advantageous further development, the injection-molding die can be designed so that the cavity or the volume of the cavity forming the molded part is increased before, during or after step b), that is addition of the fluid into the still molten plastic material. This embodiment of an injection-molding die is generally termed as a breathing die.

After the cavity has been relieved of pressure or the residual liquid possibly remaining has been removed from the cavity, the opening(s) to the cavity can be sealed by re-injection of melt.

In one embodiment, water is suitable as the liquid having high thermal capacity. However, it is also conceivable to use liquid carbon dioxide or liquid nitrogen or alcohols. The use of mixtures, such as water and low-boiling liquids, such as alcohol, is also proposed for the process of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of various embodiments of the invention follows.

Figure 1:
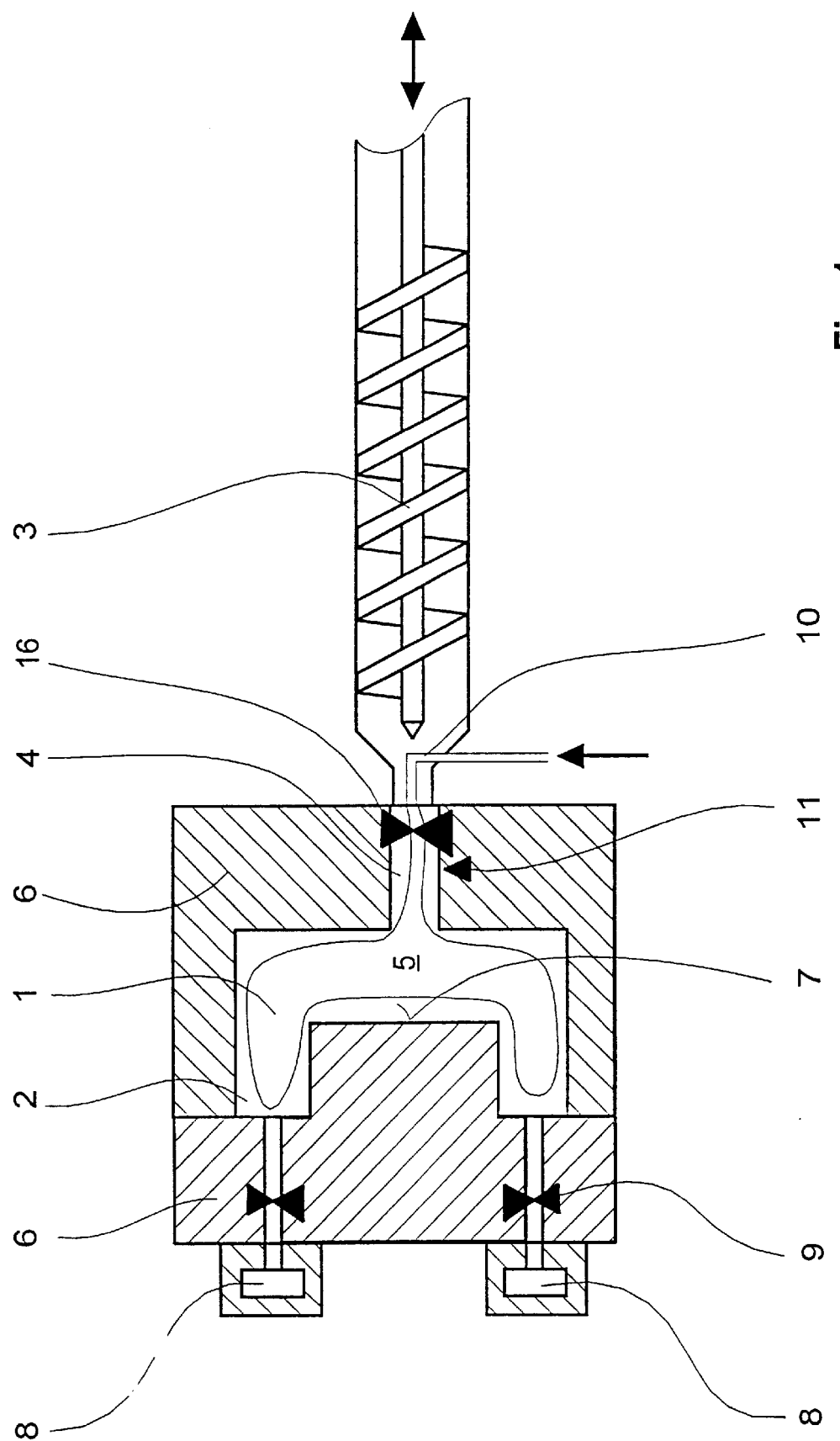
FIG. 1 is the schematic section through an injection-molding device.

An injection-molding device, which has an injection unit 3 which produces plastic melt in conventional manner and injects it into an injection-molding die 6, can be seen in FIG. 1. The die 6 has a cavity 5 with a cavity wall 7. The plastic melt is thus injected from the injection unit 3 into the die 6 along a melt flow path 4 through a machine nozzle.

The molded part 2 to be produced thus has a cavity 1, which firstly makes the part lighter and requires less use of material, which secondly makes it possible that during cooling of the melt, the latter is pressed against the cavity wall 7 in the cavity 5. The molded parts 2 produced therefore have a particularly good surface quality.

Provision can be made in that during injection of the melt into the cavity 5 and/or during addition of the fluid, some of the melt flows over into an overflow cavity 8. Overflow can be controlled or regulated by valve means 9.

Injection of the fluid takes place predominantly via the injection nozzle 10. As can be seen, the fluid therefore expands along the melt flow path 4 in the direction of the cavity 5.

A liquid having high thermal capacity is used according to a particular embodiment of the invention as fluid. This leads to a very short cycle time, since the liquid can absorb much heat from the plastic melt. It therefore solidifies in a short time, which is why the releasing process—compared with known processes—can start earlier.

The cavity 5 is completely or partly, for example 80%, filled before injection of the liquid. The liquid, which can include water, is then injected. After injecting the liquid, the blocking means 16 are closed, controlled valves, followers or similar can be used here, so that neither melt nor liquid can escape from the cavity. The predominantly cold liquid withdraws heat from the plastic melt and thus accelerates the solidification process. Provision is thus made in that the liquid absorbs so much heat that it, in a particular embodiment, transfers completely from the liquid to the gaseous state. The increase in volume thus produced (from liquid to gas) has an additional positive effect, since the internal pressure of the molded part is increased and thus the plastic is pressed even more strongly against the cavity wall.

By tempering the liquid, namely by cooling to a value between about 4° C. and 15° C., it is possible to ensure that very rapid curing of the plastic melt takes place, wherein it is sufficient to cool the plastic material such that it is self-supporting.

It can be seen in FIG. 1 that the addition of the liquid along the melt flow path 4 takes place in the region of the sprue 11. The detailed design of the region of the injection-molding die is shown in FIGS. 2 and 3.

Figure 2:
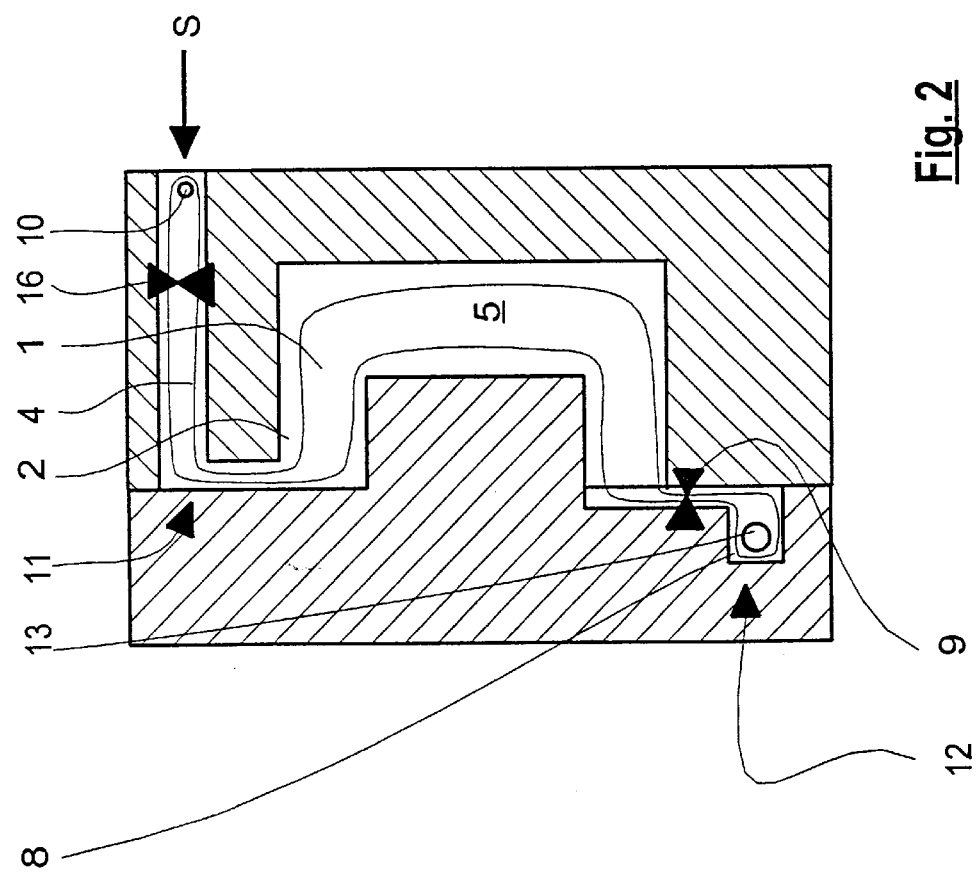
FIG. 2 is the schematic section through an injection-molding die with side cavity.

As can be seen in FIG. 2, melt S is injected into the cavity 5 in the sprue region 11. For example, water is added via the injection nozzle 10 for liquid. The displaced melt flows, as has already been mentioned above, at the flow path end from the main cavity 5 into the side cavity 8, wherein overflow is regulated by means of valve means 9. After at least partly completed curing, the interior of the molded part must be relieved of pressure again and residual liquid optionally remaining, which fills the cavity 1, must be removed again from the latter, this can take place, for example via the blow-off nozzle 13. In order to remove residual liquid which is present from the cavity 1, the blocking means 16 are opened again and compressed air is introduced into the injection nozzle for liquid 10.

As can be seen from FIG. 2, the cavity 1 extends via the cavity 5 into the side cavity, which has been effected by the addition of liquid into the melt. A blow-off nozzle 13 is positioned in the region of the overflow cavity 8, namely at the blow-off point 12 for liquid. Remaining liquid can be blown off from the cavity 1 by the injection of compressed air through the nozzle 10. It is driven out through the blow-off nozzle 13. A vacuum can thus be applied to the blow-off nozzle 13—in supporting manner. The blow-off nozzle 13 can also be arranged at the end of the main cavity 5.

Figure 3:
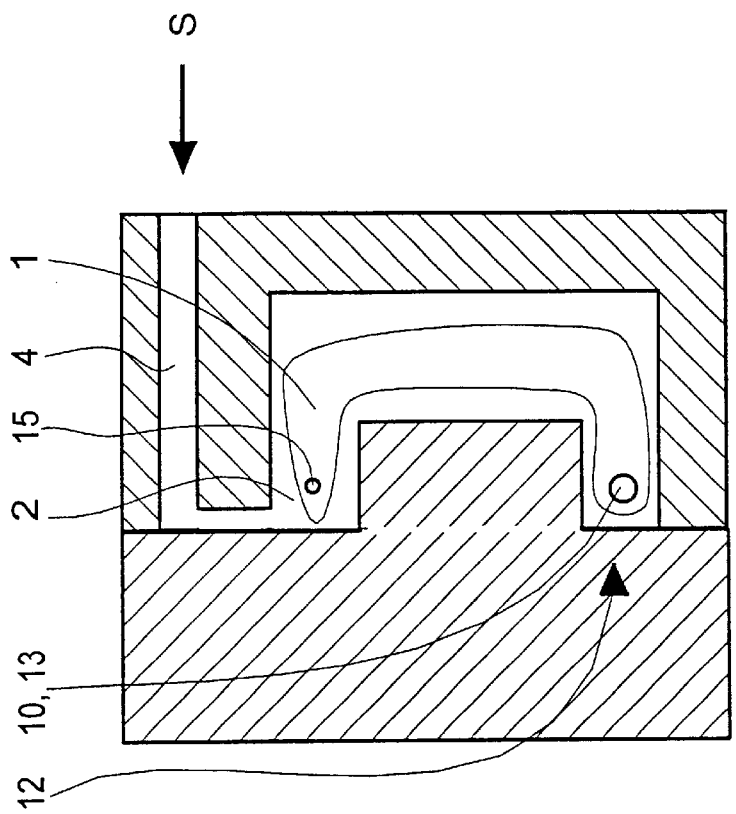
FIG. 3 is the same section as in FIG. 2, but without side cavity.

FIG. 3 shows a further process of the invention. The cavity completely filled with melt is exposed to liquid via the injection nozzle for liquid 10, which is arranged at the end of the cavity. The melt thus displaced is pressed back via the melt flow path 4 counter to its flow direction and indeed so far that the gas addition point 15 can project into the cavity 1 formed. All openings are then closed, so that neither melt nor liquid can be supplied or discharged. As already described above, heat transfer from the melt to the liquid now takes place until the latter has at least partly changed the state of aggregation. Relieving of pressure then takes place via nozzles 10 or 13. In order to remove residual liquid possibly remaining from the cavity 1, the latter is exposed to compressed gas in order to remove the liquid from the cavity via the blow-off point for liquid 13. Provision is thus made to use a nozzle as described in FIG. 4. However, the process can also be used without pressing back the melt, care should be taken here only to ensure that the gas addition point 15 is positioned so that it can project into the cavity 1 as described above, since the latter will be considerably smaller during pure volume compensation.

Figure 4:
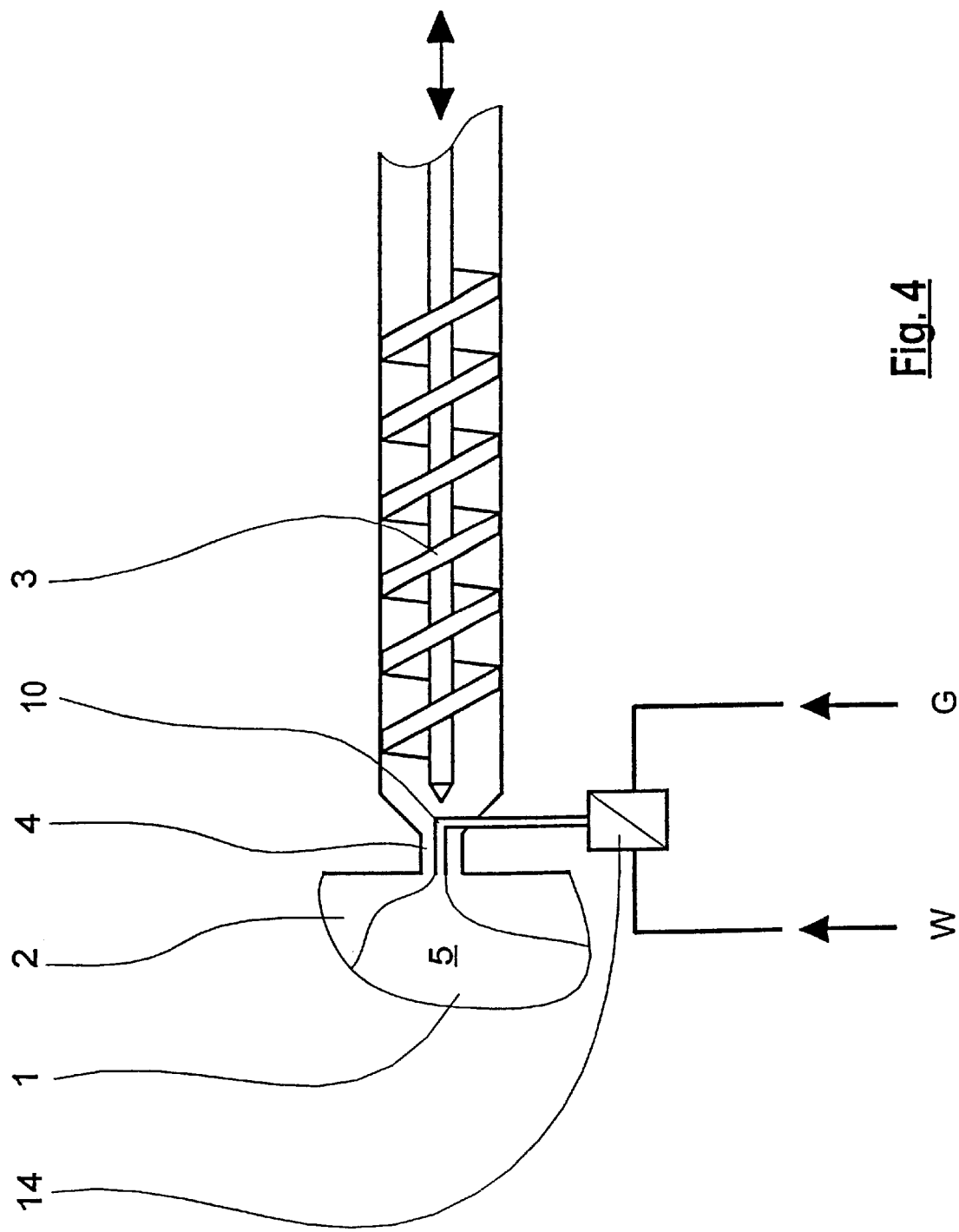
FIG. 4 is a cutout through the injection region for melt and liquid.

It can be seen in FIG. 4 that in terms of device technology, a particularly advantageous embodiment is produced when an injection element 14 is used, through which, if required, liquid (water) W or compressed air (gas) G can be injected. In FIG. 4, the injection nozzle 10 for liquid and gas indeed extends into the region of the melt flow path 4 from the injection unit 3 into the die cavity. However, it is equally possible to arrange the combined injection element 14 for liquid and gas, so that it injects liquid or gas directly into the cavity of the die via the appropriate nozzle.

The process described above can also advantageously be used for otherwise conventional injection-molding processes. For example, it can also be used well if the molded part is injection-molded from more than one plastic component (2-C process).

Furthermore, it is possible, for example to inject the liquid into the die at two points, hence to produce two media bubbles and arrange for them to melt with one another by appropriate pressure control.

Furthermore, the addition of liquid can also take place in the spreader, as a result of which several part cavities can be supplied with liquid.

The apparatus and method of injection can be implemented herein as disclosed in U.S. application Ser. No. 10/106,884, (Attorney's Docket No. 1959.2016-000), filed on Mar. 22, 2002, the entire teachings of which are incorporated herein in their entirety.

While this invention has been particularly shown and described with references to preferred embodiments thereof, it will be understood by those skilled in the art that various changes in form and details can be made therein without departing from the scope of the invention encompassed by the appended claims.

What is claimed is:

1. Process for injection molding of a molded part made from plastic material having at least one cavity comprising:
   a) injection of plastic melt from an injection unit along a melt flow path into the cavity of an injection-molding die;
   b) injection of a liquid into the still molten plastic material, so that the latter is pressed against the walls of the cavity;
   c) allowing the plastic material to solidify until the latter forms the molded part in self-supporting manner; and
   d) releasing the molded part from the cavity of the injection-molding die;

wherein after injecting the plastic melt according to step a) and after injecting the liquid according to step b), both the melt flow path and a flow path via which the liquid is injected, are closed, and wherein releasing according to step d) only takes place when the injected liquid has transferred at least partly to a gaseous state of aggregation, and wherein, before releasing according to step d), relieving of pressure in the interior of the molded part takes place by introducing a vent opening.

2. Process according to claim 1, wherein the plastic material includes a thermoplastic material.

3. Process according to claim 1, wherein the liquid has a high thermal capacity.

4. Process according to claim 1, wherein during process step b), some of the still molten plastic material is displaced from the cavity into a spillover cavity.

5. Process according to claim 4, wherein the flow of plastic material from the cavity into the side cavity is controlled by valve means, which are opened or closed according to a temporal model.

6. Process according to claim 1, wherein the liquid is injected into the cavity along the melt flow path through a sprue region.

7. Process according to claim 1, wherein the liquid is injected into the cavity directly by means of an injection nozzle.

8. Process according to claim 7, wherein some of the plastic material situated in the cavity is driven back out from the cavity during step b) by the injected liquid in the direction of the injection unit.

9. Process according to claim 1, wherein a pressure which is increased with respect to the ambient pressure is built up in the cavity by introducing a gas before injection of the plastic melt according to step a).

10. Process according to claim 9, wherein the gas pressure during step b) is let down gradually.

11. Process according to claim 10, wherein the letting down of the gas pressure is controlled or regulated as a function of how the injection pressure of the liquid increases during step b).

12. Process according to claim 9, wherein the gas pressure during step b) is let down suddenly.

13. Process according to claim 12, wherein the letting down of the gas pressure is controlled or regulated as a function of how the injection pressure of the liquid increases during step b).

14. Process according to claim 1, wherein the liquid is tempered before injection into the still molten plastic material according to step a).

15. Process according to claim 14, wherein the liquid is cooled to a preset temperature range.

16. Process according to claim 15, wherein the preset temperature range lies between about 0° C. and 20° C.

17. Process according to claim 16, wherein the preset temperature range lies between about 4° C. and 15° C.

18. Process according to claim 15, wherein the preset temperature range lies between about 20° C. and 15° C.

19. Process according to claim 18, wherein the preset temperature range lies between about 40° C. and 100° C.

20. Process according to claim 1, wherein after step c) and immediately before step d), the following process step is executed:
   c') injection of compressed gas, along the path through which the liquid was injected into the plastic material, and blowing-off of any residual liquid remaining in the interior of the molded part, from the cavity of the molded part at at least one blow-off point, which is situated at a point, which is remote from the addition point of the liquid.

21. Process according to claim 20, wherein the gas includes compressed air.

22. Process according to claim 20, wherein the blow-off point is arranged in the region of the flow path end of the plastic material.

23. Process according to claim 1, wherein after step c) and immediately before step d) according to claim 1, the following process step is executed:
   c") injection of compressed gas at a gas addition point which is remote from the point at which the liquid was injected into the plastic material, and blowing-off of any residual liquid remaining in the interior of the molded part, from the cavity of the molded part via the point at which the liquid was injected into the plastic material.

24. Process according to claim 23, wherein the gas includes compressed air.

25. Process according to claim 1, wherein after step c) and immediately before step d), the following process step is executed:
   c'") applying a vacuum at a point fluidly connected to the liquid-filled cavity, in order to draw off any residual liquid remaining in the cavity from the cavity.

26. Process according to claim 25, wherein the vacuum is applied to the injection nozzle for liquid.

27. Process according to claim 1, wherein water is used as the liquid.

28. Process according to claim 1, wherein a mixture of water with at least one low-boiling liquid is used as the liquid.

29. Process according to claim 28, wherein the at least one low-boiling liquid includes alcohol.

30. Process according to claim 1, wherein introducing the vent opening includes introducing a bore.

31. Process for injection molding of a molded part formed from a plastic material and having at least one cavity, comprising:
   a) injecting plastic melt into a cavity of an injection-molding die;
   b) injecting a liquid into the cavity of the injection-molding die while the plastic melt is at least partially melted so as to press at least some of the plastic melt against at least one wall of the injection-molding die to form the at least one cavity of the part, the liquid at least partly transferring to a gaseous state;
   c) allowing the plastic material to cool until it forms the molded part in a self-supporting manner;
   d) relieving any pressure in the cavity of the injection-molding die by introducing a vent opening; and
   e) releasing the molded part from the cavity of the injection-molding die.

32. Process according to claim 31, further comprising closing a melt flow path and a flow path of the liquid after the liquid is injection into the cavity.

33. Process according to claim 31, wherein the step of releasing the molded part from the cavity of the injection-molding die takes place after the liquid is at least partly transferred to the gaseous state.

34. An apparatus for forming an injection-molded part formed from a plastic material and having at least one cavity, comprising:
   an injection-molding die having at least one cavity wherein the injection-molded part is formed;
   an injection unit for injecting the at least one cavity of the injection-molding die with plastic melt;
   a supply of liquid that is injected into the at least one cavity of the injection-molding die while the plastic melt is at least partially melted so as to press at least some of the melt against at least one wall of the injection-molding die to form the at least one cavity of the injection-molded part, the liquid at least partly transferring to a gaseous state;
   a mechanism for sealing the plastic melt and the liquid in the cavity of the injection-molding die; and
   a vent opening for relieving pressure in the cavity of the injection-molding die.

* * * * *